May 28, 1935. M. T. ARCHER Re. 19,587
CASING HEAD
Original Filed April 22, 1931
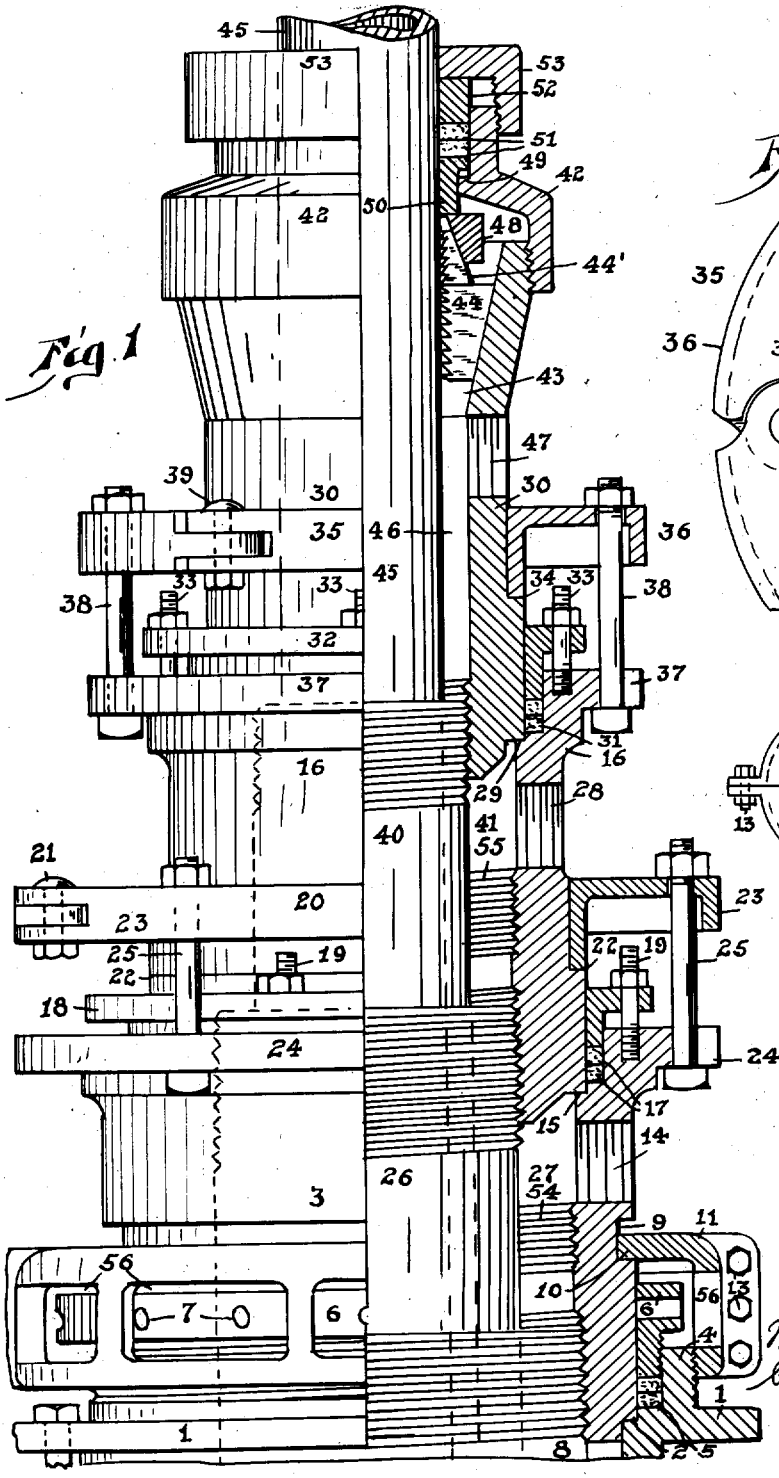
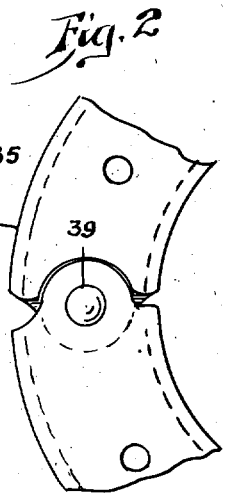
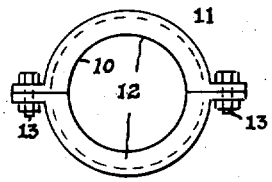
INVENTOR
M. T. Archer
by F. N. Barber
attorney Reissued May 28, 1935 Re. 19,587

UNITED STATES PATENT OFFICE 19,587

CASING HEAD

Merton T. Archer, Toledo, Ohio, assignor, by mesne assignments, to The National-Superior Company, Toledo, Ohio, a corporation of Delaware Original No. 1,887,865, dated November 15, 1932, Serial No. 531,908, April 22, 1931. Application for reissue November 10, 1934, Serial No. 752,538

15 Claims. (Cl. 285—22)

My invention relates to casing heads for wells and more particularly to casing heads of the nesting type.

One object of this invention is to provide in a casing head a series of nesting heads, each head having a shoulder for supporting the next head above and carrying packing means to seal the joint between itself and the said head supported thereby. Another object is to provide between each two heads a hold-down means to prevent excessive pressure within the well from displacing the heads from their normal seats. Other objects appear hereinafter.

Referring to the accompanying drawing, Fig. 1 shows a combined side elevation and central vertical section of a casing head involving my invention, the tubing being shown in side elevation and a portion of the lower head being broken away. Fig. 2 shows a fragment of one of the hold-down rings to illustrate its pivotal structure. Fig. 3 is a plan view of the lowest hold-down ring.

On the drawing, 1 designates the base of the casing head which is to be anchored preferably on a concrete base in a manner well known in the art and therefore not illustrated. The base 1 is a metal ring having an internal horizontal shoulder 2 on which the head 3 rests. The head 3 is telescoped into the base 1 below the shoulder 2. The base 1 has an upstanding annular wall 4 spaced from the outer wall of the head 3 to form a packing box which contains the packing rings 5 compressed by the gland 6 screwed into the inner face of the wall 4 and surrounding the head 3. The gland has a number of transverse openings 7, in selected ones of which a lever may be inserted for causing the rotation of the gland. The inner face of the lower end of the head 3 is threaded to receive the casing 8.

The exterior surface of the head 3 has the annular groove 9 to receive the annular flange 10 carried by the hold-down ring 11 which is screwed upon the exterior surface of the wall 4 for the purpose of clamping the head 3 tightly upon the shoulder 2. The hold-down ring 11 is made up of lateral members 12 secured together by bolts 13. The ring has a number of lateral openings 56 to provide access of the said lever to the openings 7.

The head 3 is provided above the groove 9 with one or more openings 14 in which pipes may be fitted to conduct away any fluid rising into this portion of the head. Above the opening 14 the inner face of the head 3 has near its upper end the annular shoulder 15 upon which rests the second annular head 16. The head 16 is surrounded by the upper end of the head 3 and spaced therefrom above the shoulder 15 to form a stuffing box containing the packing rings 17. 18 is an annular gland resting on the packing rings 17 and adjustably connected to the top of the head 3 by screws 19.

20 is a hold-down ring made up of sections pivoted together at 21. It rests upon the horizontal external annular shoulder 22 on the head 16. The ring 20 surrounds the head 16 a short distance above the gland 18 and has the horizontal flange 23 connected to a similar flange 24 on the upper end of the head 3 by bolts 25. The bolts cause the ring 20 to hold the heads 3 and 16 in rigid relationship.

The lower-inner face of the head 16 is threaded to receive the tubing 26 which has a smaller diameter than the casing 8 and extends down through the same. The inner wall of the head 16 extends inwardly for a sufficient distance to provide an annular space 27 between the head 3 and the tubing 26 and between the casing 8 and the tubing 26.

The head 16 has one or more lateral openings 28 to receive any fluid that may rise into the head 16 through the tubing 26.

The inner face of the head 16 near its upper end is provided with the annular horizontal shoulder 29 upon which the annular head 30 rests. The upper end of the head 16 is spaced from the head 30 to provide a stuffing box which receives the packing rings 31 compressed by the annular gland 32 surrounding the head 30 and adjustably connected to the upper end of the head 16 by bolts 33. The outer face of the head 30 a short distance above the gland 32 is provided with the annular external shoulder 34 on which the hold-down ring 35 rests. The horizontal flange 36 of the ring 35 is adjustably connected to the corresponding flange 37 on the upper end of the head 16 by bolts 38. The packing ring 35 is made up of sections connected together by the pivot 39.

The inner face of the lower end of the head 30 is threaded to receive the tubing 40. The inner wall of the head 30 extends inwardly within the head 16 sufficiently to form the annular space 41 between the head 16 and the tubing 40 and also between the tubing 26 and the tubing 40, the former extending down through the latter. The opening 28 is to be provided with a pipe for conducting away any fluid collecting in the annular space 41.

The upper end of the head 30 is flared and has a cap 42 screwed upon its outer face. The inner wall 43 of the upper end of the head 38 is provided with a number of slips or keys 44, only one shown, with upwardly and inwardly projecting teeth adapted to engage the outer surface of the tubing 45 extending down through the head 38 and the tubing 40, the tubing 45 being separated from the inner wall of the head 38 to form the annular space 46. There are one or more lateral openings 47 in the head 38 slightly above the hold-down ring 35 to receive pipes for the discharge of any fluid which rises in the space 46.

The upper end of the slips 44 support the keys 44′ having downwardly-projecting teeth lying against the outer face of the tubing 45, only one key 44′ being shown. The outer face of the keys 44′ are tapered upwardly and receive the clamping ring 48 having its inner face tapered to correspond with that on the outer faces of the keys 44′. It is the function of the ring 48 to cause the keys 44′ to engage the tubing 45 and prevent its upward movement.

The inner face of the cap 42 above the ring 48 is provided with an internal annular horizontal shoulder 49 serving as a stop for the ring 50. This ring extends down to the upper end of the ring 48, and closely surrounds the tubing 45 and supports the packing rings 51 lying between the upper end of the cap 42 and the tubing 45. 52 is a gland or ring resting upon the upper ends of the packing rings, the gland being adjusted by the screw cap 53 surrounding the tubing 45 and threaded upon the exterior surface of the cap 42.

The slip type of tubing head shown above the opening 47 has been included to show the entire assembly complete, but forms no part of the present invention.

It is evident that my invention is not limited to the number of heads shown as other heads like the head 16 may be interposed between my two consecutive heads.

The internal walls at the intermediate portions of the heads 3 and 16 are provided with threads 54 and 55 to which nipples or short lengths of pipe may be temporarily connected for attachment of a power hoisting device whereby the heads with their attached tubes may be lowered into the positions shown.

The hold-down rings are made in two separable parts so that they may closely surround the heads which are larger above and below the same.

I claim:

1. In a casing head, a plurality of annular superposed heads, each head having an internal shoulder on which the next head above rests, a stuffing box surrounding each upper head above the shoulder upon which the upper head rests, packing within each stuffing box, an annular gland resting on each packing, and adjustable means connecting each head and its associated gland for varying the compression of the packing.

2. In a casing head, a plurality of annular superposed heads, each head having an internal shoulder on which the next head above rests, a stuffing box surrounding each upper head above the shoulder upon which the upper head rests, packing within each stuffing box, an annular gland resting on each packing, and adjustable means connecting each head and its associated gland for varying the compression of the packing, in combination with a well-tube threaded to the lower end of each head, each head having a smaller diameter than the next lower head whereby the tubes may extend downwardly in concentric relationship.

3. In a casing head, a plurality of annular superposed heads, each head having an internal shoulder on which the next head above rests, a stuffing box surrounding each upper head above the shoulder upon which the upper head rests, packing within each stuffing box, means for adjustably compressing the packing, and a second means for retaining each upper head upon the shoulder on which it rests.

4. In a casing head, a plurality of annular superposed heads, each head having an internal shoulder on which the next head above rests, a stuffing box surrounding each upper head above the shoulder upon which the upper head rests, packing within each stuffing box, an annular gland resting on each packing, adjustable means connecting each head and its associated gland for varying the compression of the packing, a hold-down ring surrounding each head and supported thereby and provided with a flange, a flange on each head, the flanges lying transversely of the heads, the adjustable means for the gland for each head being between the pair of flanges on each head and on the next ring above the same, and bolts connecting each pair of flanges and standing radially beyond the said adjustable means whereby access may be had to the adjustable means for operating the same.

5. In a casing head, a lower head having an annular transverse internal shoulder, an upper head seated on the shoulder, a packing ring between the heads and above the shoulder, an annular gland surrounding the upper head and resting on the packing ring, means connected to the lower head for adjusting the packing ring, a hold-down ring supported by the upper head and surrounding the same and overhanging the gland, and bolts connecting the lower head and the hold-down ring on the said shoulder and the two heads into a rigid unit.

6. In a casing head, a lower head having an annular transverse internal shoulder, an upper head seated on the shoulder, a packing ring between the heads and above the shoulder, an annular gland surrounding the upper head and resting on the packing ring, means connected to the lower head for adjusting the packing ring, a hold-down ring supported by the upper head and surrounding the same and overhanging the gland, and an adjustable connection between the ring and the lower head for clamping the upper head to the said shoulder.

7. In a casing head, the combination of a body member provided with an annular transverse internal shoulder, a second member seated on said shoulder and arranged to support an inner string of casing, a packing ring between these two members and above the shoulder, an annular gland surrounding the second member and bearing on the packing ring, means for adjusting the packing ring, and hold down means for retaining the second member in place on the body member both of said means being independently accessible and adjustable with respect to one another.

8. In a casing head, the combination of a body member provided with an annular transverse internal shoulder, a second member seated on said shoulder, a packing ring between the members and above the shoulder, an annular gland surrounding the second member and bearing on the packing ring, means for adjusting the packing ring, means carried by the second member and overhanging the gland, and bolts connecting said last named means with the body member to retain the second member in place on the body member.

9. In a casing head assembly, the combination of a body member having a bore therethrough, means for securing the body member to a casing, a second member having a lateral vent supported on the body member and arranged to support an inner string of casing depending therefrom, means defining a packing groove between said members, packing means in said groove, follower means extending above the body member and around the second member and including pressure applying means to expand the packing means to form a pressure tight seal between said members, and releasable means independent of the pressure applying means to anchor the second member immovable relative to the body.

10. In a casing head assembly, the combination of a body member having a bore therethrough, means for securing the body member to a casing, a second member having a lateral vent supported on the body member and arranged to support a string of casing depending therefrom, packing means in contact with the bore of the body and the outer periphery of the second member, a follower means operatively associated with the packing means, releasable means to anchor the second member immovable relative to the body, and means accessible with the last said means in position to adjust the position of the follower means with relation to the packing means.

11. In a multi-stage type casing head, a plurality of superposed members each member supported within the next adjacent lower member and arranged to support a string of casing depending therefrom, releasable means to anchor said members together, packing means between said members and above the point of support thereof, follower means for said packing means, and pressure applying means to adjust the position of said follower means to expand said packing means, said pressure applying means being accessible with the releasable anchoring means in operative position.

12. In a casing head, the combination of a body member having a bore therethrough and provided with means for securing said body member to an outer string of casing, a second member mounted on the body member and secured thereto, means for suspending the intermediate casing from said second member, packing between said members and above the mounting of the second member, a follower member to compress the packing, means independent of the securing arrangement between the members to adjust the follower means, and means on the upper interior of the second member for suspending the inner casing therefrom.

13. In a casing head, the combination of a body member having a bore therethrough and provided with means for securing said body member to an outer string of casing, a second member mounted on the body member and secured thereto, means for suspending the intermediate casing from said second member, packing between said members and above the mounting of the second member, a follower member to compress the packing, means independent of the securing arrangement between the members to adjust the follower means, and means comprising a conical interior surface of said second member and slips engaging the same for suspending the inner casing from the second member.

14. In a multi-stage type casing head, a plurality of superposed members, said members being inserted in part one within the other, releasable means to anchor said members together, packing means to seal each of the joints defined between the bore of one member and the inserted portion of the adjacent member, follower means for said packing means, and pressure applying means to adjust the position of said follower means to expand said packing means, said pressure applying means being accessible with the releasable anchoring means in operative position.

15. In a casing head the combination of an outer member having a bore, an inner member arranged to be supported within said bore, and arranged to support a string of tubing, means for preventing relative movement between the members, sealing means between the outer and inner members and above the point of support of the latter to be accessible independently of the first mentioned means.

MERTON T. ARCHER.